United States Patent [19]

Yan et al.

[11] 4,397,819

[45] Aug. 9, 1983

[54] REJUVENATION OF THE ANION EXCHANGER USED FOR URANIUM RECOVERY

[75] Inventors: Tsoung-Yuan Yan, Philadelphia, Pa.; Wilton F. Espenscheid, DeSoto, Tex.

[73] Assignee: Mobil Oil Corporation, New York, N.Y.

[21] Appl. No.: 221,557

[22] Filed: Dec. 31, 1980

[51] Int. Cl.³ ............................................. C22B 60/02
[52] U.S. Cl. .......................................... 423/7; 423/17; 423/18; 423/20
[58] Field of Search .................... 423/7, 18, 20, 17; 210/670

[56] References Cited

U.S. PATENT DOCUMENTS

| | | | |
|---|---|---|---|
| 2,780,514 | 2/1957 | Lutz | 423/7 |
| 2,811,412 | 10/1957 | Poirier | 423/7 |
| 2,864,667 | 12/1958 | Bailes et al. | 423/7 |
| 2,982,605 | 5/1961 | Mouret et al. | 423/7 |
| 3,180,703 | 4/1965 | Ableson et al. | 423/7 |
| 3,252,920 | 5/1966 | Goren | 423/7 X |
| 3,313,726 | 4/1967 | Campbell | 210/670 X |
| 4,105,253 | 8/1978 | Showalter | 423/18 X |
| 4,241,026 | 12/1980 | Yan | 423/7 |
| 4,312,838 | 1/1982 | Yan | 423/7 |

OTHER PUBLICATIONS

Merritt; Robert C. "The Extractive Metallurgy of Uranium" Colorado School of Mines Research Institute, 1971, pp. 161–163.

*Primary Examiner*—Deborah L. Kyle
*Assistant Examiner*—Matthew A. Thexton
*Attorney, Agent, or Firm*—Charles A. Huggett; James F. Powers, Jr.; John K. AboKhair

[57] ABSTRACT

A process is described for restoring and maintaining the total ion exchange capacity of the resin used for uranium recovery in in situ uranium leaching. The used resin of lowered exchange capacity is treated with a solution containing $Na_2CO_3$ or $NaHCO_3$, or admixtures thereof. The process preferably is used in conjunction with acid elution of the uranium from the resin.

5 Claims, No Drawings

REJUVENATION OF THE ANION EXCHANGER USED FOR URANIUM RECOVERY

FIELD OF THE INVENTION

This invention relates generally to the recovery of mineral values, in particular uranium, from leachates produced during leaching operations in subterranean formations. More specifically, this invention provides processes for rejuvenating anion exchange resins which are used to concentrate the uranium from the leachate and which become at least partially spent during continuous or repetitive use.

BACKGROUND OF THE INVENTION

In situ leaching operations for recovering uranium from formations involve oxidizing the insoluble tetravalent uranium to its hexavalent form and solubilizing it. For example, $CO_2/O_2$ leaching solutions, which are often used for in situ leaching operations, result in oxidation $$UO_2 + [O] + H_2O \rightarrow UO_2^{+2} + 2\ OH^-$$

and in formation of a soluble uranyl carbonate complex, $$UO_2^{+2} + 3\ CO_3^= \rightarrow UO_2(CO_3)_3^{-4}.$$

Practically, one embodiment of the $CO_2/O_2$ leaching solution involves injecting a solution of $CO_2$ and $O_2$ through at least one injection well into the subterranean formation, allowing leaching to occur, and then pumping the leachate pregnant in uranium in the form of a soluble uranyl complex from the formation through a production well.

The leachate contains other mineral values in addition to the uranium. Ion exchange techniques are now commercially used to recover, concentrate, and selectively isolate uranium. Such ion exchange techniques depend on the existence of anionic complexes of uranium in solution which, under proper conditions, are selectively adsorbed from a leachate by suitable synthetic resins. As suggested above, the complex anion of uranium, produced during $CO_2/O_2$ leaching, is the tetravalent uranyl tricarbonate anion, $[UO_2(CO_3)_3]^{-4}$, which predominates although a divalent ion, $[UO_2(CO_3)_2 \cdot 2\ H_2O]^=$ may exist at low carbonate concentrations. Generally, the adsorption of the tetravalent uranyl tricarbonate anion, by ion exchange, is accomplished by use of strong base anionic exchange resins. The strong base anionic exchange resins contain quaternary ammonium functional groups as the active anion constituent. Some are made by the chloromethylation of polystyrene and subsequent treatment with a tertiary amine. Pyridinum groups may be substituted in part for the amine groups in some resins developed specifically for uranium recovery. The strong base anionic resins are highly ionized, usable over a wide pH range, stable in the absence of strong reducing or oxidizing agents, insoluble in most of the common solvents and will withstand temperatures up to about 60° C.

Notwithstanding the aforementioned properties of those resins, the performance of strong base anionic exchange resin deteriorates during usage, due to the repeated conditions of loading (adsorption) and elution and due to poisoning. Performance deterioration of the resin is manifested by a decrease in loading capacity and early uranium "leakage". Performance deterioration may be irreversible if due to complete and actual removal of at least some of the active ion groups, but reversible if due to constructive removal of those active ion groups which form strong physical or chemical bonds with poisons and fouling agents.

The present invention is directed to improving the performance of strong base anionic exchange resins used in uranium recovery and which exhibit an undesirable decrease in loading capacity (early uranium leakage) and in total exchange capacity. Total exchange capacity of a resin is usually expressed as either milliequivalents per gram of anhydrous resin or per milliliter of water-swollen resin. Dowex 21K, a typical commercially available resin used in uranium recovery has a dry capacity of 4.5 milliequivalents per gram and a wet capacity of 1.25 milliequivalents per milliliter. Deterioration in performance, referred to above, involves a decrease in this total capacity of the resin.

The invention comprises treating a strong base anionic exchange resin exhibiting performance deterioration to remove physically adsorbed and occluded fouling agents and to remove poisons which may be chemically bound to active ion groups on the resin. The process of the invention involves treating the resin, after the uranium ion exchange stage, with an alkaline carbonate solution. Preferably, the process involves treating the resin with an acid eluant prior to treating the resin with the alkaline carbonate solution. It is believed that after resin has been used to recover uranium from a $CO_2/O_2$ leachate, the acid treatment dissolves insoluble fouling agents which are physically occluded or adsorbed by the resin and that the weak base treatment augments that result and probably removes poisons which are physically or chemically bound to the resin.

In a preferred embodiment of the invention, the acid treatment of the strong base anion exchange, hereinafter referred to as "acid elution", precedes the weak base treatment of the resin. By way of illustration, it is this embodiment which will be discussed below. In this embodiment, the strong base anionic change may be loaded with uranium as at the end of the loading cycle.

In the preferred embodiment, the first stage of the invention process is an acid elution of the resin. In the acid elution, sufficient acid is passed over the resin to dissolve uranium in the form of uranyl carbonate anion complexes, $CaCO_3$ (calcite, which is removed from the subterranean formation and dissolved in the leachate during the leaching operation) and other foreign matter which is, or becomes, soluble in acid. Preferably, the acid eluant is HCl (and NaCl) so as to keep the resin free from calcite plugging. In one test the eluant contained 6 g/l NaCl and 1.0 N HCl. The acid elution restores the loading characteristics of the resin or, in other words, decreases uranium leakage. Such regeneration, it is believed, is due to dissolution of calcite and other foreign matter, resulting in improved diffusivity.

Prior to this invention, it was suggested by others to elute with an alkaline carbonate solution of NaCl 60 g/l, $NaHCO_3$ 5 g/l and $NaHCO_3$ 5 g/l. However, as shown hereinafter use of an eluant of NaCl and HCl provides superior results.

After acid elution, the elution resin is treated by contact with an alkaline carbonate solution for a period of time sufficient to substantially restore the resin to its original total ion exchange capacity. Change in, and thus restoration of, total ion capacity can be measured by conventional acid/base titration. Typically, a carbonate solution, used in this stage, will contain both NaHCO3 and Na2CO3; each of which may be present in an amount ranging from 0.5 g/l to 100 g/l. The time period of treatment can range from about 0.5 to 100 hours. In a specific run, a resin having a total capacity of 1.4 meq/cc but which had deteriorated to 0.5 meq/cc was acid eluted. Total ion exchange capacity was then restored when the resin was contacted with a solution containing 5 g/l Na2CO3 and 5 g/l NaHCO3 for six (6) hours.

Contact between the resin and the carbonate solution can be effected by soaking or, preferably, by continued washing. To conserve the solution, the rate of wash can be kept low, at about 0.05 to 5 cc of solution per cc of resin per hour.

The table set forth below reports data showing substantial restoration of the total resin capacity by acid elution and carbonate treatment of a resin exhibiting deteriorated loading capacity.

Treatment of Field Loaded Resins to Remove Poisons and Restore Exchange Capacity

| Run No. | 802 | 804 |
|---|---|---|
| Resin Source* | IX-1, containing CaCO3, crushed | Acid washed, field loaded |
| History Elution | NaCl: 6 g/l<br>HCl: 1.0 N | NaCl: 60 g/l<br>NaHCO3: 5 g/l<br>Na2CO3: 5 g/l |
| Treatment | Na2CO3: 20 g/l<br>NaHCO3: 20 g/l<br>4 days | 5% NaOH<br>24 hours |
| Exchange Capacity meq/cc | 0.92 | 0.82 |

*The resins in Runs 802 and 804 were IRA 430 sold commercially by Rohm and Haas Co.

The acid eluted resin which has not been subjected to treatment with the carbonate solution, in accordance with the process of the invention appears to contain poisons which lower the total capacity of the resin greatly, sometimes by as much as two-thirds. Because of this great reduction in the total capacity of the resin, it is believed that such poisons are more than physically adsorbed by the resin. Rather, the poisons can be anionic species which are strongly exchanged on the resin. Moreover, it is believed that such poisonous anions are uranyl chloride anions, $UO_2Cl_4^{-2}$, which are known to poison the resins. Thus, one theory of explaining the efficiency of the invention in restoring the total ion exchange capacity to the resin is that such a uranyl chloride resin is decomposed by the use of the carbonate solution, according to equilibrium equations (1) and (2):

$$UO_2Cl_4^{-2} \rightleftharpoons UO_2^{++} + 4\,Cl^- \tag{1}$$

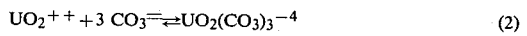

$$UO_2^{++} + 3\,CO_3^= \rightleftharpoons UO_2(CO_3)_3^{-4} \tag{2}$$

That is, the possible explanation is that carbonate, in the carbonate solution, shifts both equilibriums, represented by equations (1) and (2), to the right with resulting decomposition of $UO_2Cl_4^{-2}$. Applicants, however, do not wish to be bound by this theory, as it depends on characterization of the material which poisons the resin as necessarily being $UO_2Cl_4^{-2}$. However, if this theory is correct, it is clear that the carbonate solution should be free of, or substantially free of, chloride ions.

The foregoing description of our invention has been directed to particular details in accordance with the requirements of the Patent Act and for purposes of explanation and illustration. It will be apparent, however, to those skilled in this art that many modifications and changes may be made without departing from the scope and spirit of the invention. It is further apparent that persons of ordinary skill in this art will, on the basis of this disclosure, be able to practice the invention within a broad range of process conditions. It is our intention in the following claims to cover all such equivalent modifications and variations as fall within the true scope and spirit of our invention.

We claim:

1. A process for restoring the ion exchange capacity of a strong base anion exchange resin used for recovering uranium, in the form of uranyl carbonate anions, from solutions used to leach uranium from subterranean formations which comprises:
   treating the resin with acid to elute uranium values therefrom;
   washing the resin with a solution containing 0.5 to 100 grams/liter of sodium carbonate, sodium bicarbonate, or admixtures thereof, for a time sufficient to substantially free the resin of materials which are either soluble in said solution or react with said solution.

2. A process for isolating uranium which has been leached from subterranean formations by a leach solution containing carbon dioxide and oxygen wherein said leach solution has been contacted with a strong base anion exchange resin so that uranium contained in the leach solution is exchanged on said resin and for substantially restoring to said resin its original total ion exchange capacity prior to being contacted with said leach solution which comprises:
   eluting the resin with hydrochloric acid to remove uranium in the form of uranyl carbonate anions, and contacting the resin with a solution of sodium carbonate, sodium bicarbonate, or admixtures thereof for a time sufficient to substantially restore said total ion exchange capacity.

3. The process of claim 2, wherein said solution contains 0.5 to 100 grams of sodium carbonate, sodium bicarbonate, or admixtures thereof per liter of solution.

4. An improved process for the recovery of uranium values from a uranium-containing lixiviant, utilizing a strong base anion exchange resin, comprising the steps of:
   (a) passing the uranium-containing lixiviant through the strong base anion exchange resin to cause said resin to retain uranium values;
   (b) eluting the resin with hydrochloric acid to remove uranium values therefrom;
   (c) repeating steps (a) and (b) until total uranium loading capacity of the resin is substantially reduced.
   (d) washing the resin with a solution of sodium carbonate, sodium bicarbonate, or admixtures thereof for a time sufficient to restore said total uranium loading capacity; and
   (e) recycling the restored resin for utilization in step (a).

5. The process of claim 4 wherein the washing solution contains 0.5 to 100 grams of sodium carbonate, sodium bicarbonate, or admixtures thereof per liter of solution.

* * * * *